(12) United States Patent
Kitao et al.

(10) Patent No.: US 11,444,422 B2
(45) Date of Patent: Sep. 13, 2022

(54) ROTARY CONNECTOR DEVICE AND FIXED BODY OF ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Satoshi Kitao, Inukami-gun (JP); Shingo Nambu, Inukami-gun (JP); Kenji Yoshimura, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 17/109,149

(22) Filed: Dec. 2, 2020

(65) Prior Publication Data

US 2021/0091525 A1 Mar. 25, 2021

Related U.S. Application Data

(63) Continuation of application No. PCT/JP2019/022019, filed on Jun. 3, 2019.

(30) Foreign Application Priority Data

Jun. 11, 2018 (JP) .............................. JP2018-110970

(51) Int. Cl.
*H01R 13/40* (2006.01)
*H01R 35/02* (2006.01)
*B60R 16/027* (2006.01)

(52) U.S. Cl.
CPC .......... *H01R 35/025* (2013.01); *B60R 16/027* (2013.01); *H01R 2201/26* (2013.01)

(58) Field of Classification Search
CPC .............. H01R 35/025; H01R 2201/26; B60R 16/027

(Continued)

(56) References Cited

U.S. PATENT DOCUMENTS

| 5,741,145 A * | 4/1998 | Kikkawa | H01R 35/025 439/15 |
| 5,871,366 A * | 2/1999 | Nishikigi | B60R 16/027 439/15 |
| 6,213,798 B1 * | 4/2001 | Kawamura | B60R 16/027 439/164 |

(Continued)

FOREIGN PATENT DOCUMENTS

| CN | 101034783 | 9/2007 |
| CN | 207003327 U | 2/2018 |

(Continued)

OTHER PUBLICATIONS

European Office Action for corresponding EP Application No. 19820272.3-1201, dated Dec. 17, 2021.

(Continued)

*Primary Examiner* — Abdullah A Riyami
*Assistant Examiner* — Vladimir Imas
(74) *Attorney, Agent, or Firm* — Mori & Ward, LLP

(57) ABSTRACT

A rotary connector device includes a fixed body and a rotation body. The fixed body includes an internal space. The rotation body is rotatably assembled to the fixed body about a rotational axis with respect to the fixed body. The fixed body includes an inserted portion into which a fixing tool is to be inserted to restrict the fixed body and the rotation body from rotating relative to each other. The inserted portion includes an inner space isolated from the internal space of the fixed body.

9 Claims, 9 Drawing Sheets

(58) Field of Classification Search
USPC .......................................................... 439/625
See application file for complete search history.

(56) References Cited

U.S. PATENT DOCUMENTS

| | | | | |
|---|---|---|---|---|
| 7,168,955 | B2* | 1/2007 | Umemura | H01R 35/025 439/15 |
| 7,364,329 | B2* | 4/2008 | Murray | F21V 21/30 362/276 |
| 8,382,500 | B2* | 2/2013 | Adachi | H01R 35/04 439/164 |
| 8,529,272 | B2* | 9/2013 | Kamiya | B60R 16/027 439/15 |
| 8,834,189 | B2* | 9/2014 | Hirai | B60R 16/027 439/164 |
| 8,911,239 | B2* | 12/2014 | Yamaguchi | H01R 35/025 439/15 |
| 9,472,914 | B2* | 10/2016 | Takahashi | H01R 35/025 |
| 9,627,832 | B2* | 4/2017 | Wade | B60R 16/027 |
| 10,286,861 | B2* | 5/2019 | Sakai | H01R 35/04 |
| 10,439,348 | B2* | 10/2019 | Hirai | H01R 35/025 |
| 10,686,286 | B2* | 6/2020 | Ushiyama | H01R 35/04 |
| 2006/0146537 | A1 | 7/2006 | Murray et al. | |
| 2013/0344706 | A1* | 12/2013 | Sato | H01R 35/025 439/15 |
| 2019/0207352 | A1 | 7/2019 | Ushiyama | |

FOREIGN PATENT DOCUMENTS

| | | |
|---|---|---|
| EP | 1160936 | 12/2001 |
| FR | 3009850 | 2/2015 |
| JP | 11-97141 | 4/1999 |
| JP | 2005-327575 | 11/2005 |
| JP | 2006-032324 | 2/2006 |
| JP | 2006-524882 | 11/2006 |
| JP | 2009-238588 | 10/2009 |
| JP | 2016-149291 | 8/2016 |
| WO | WO 2018/047581 | 3/2018 |

OTHER PUBLICATIONS

International Search Report for corresponding International Application No. PCT/JP2019/022019, dated Aug. 20, 2019.
Extended European Search Report for corresponding EP Application No. 19820272.3-1201, dated May 14, 2021.
Written Opinion for corresponding International Application No. PCT/JP2019/022019, dated Dec. 24, 2020.
Chinese Office Action for corresponding CN Application No. 201980037547.X, dated Aug. 10, 2021 (w/ English machine translation).
European Office Action for corresponding EP Application No. 19820272.3-1201, dated Jul. 8, 2022.

* cited by examiner

ROTARY CONNECTOR DEVICE AND FIXED BODY OF ROTARY CONNECTOR DEVICE

CROSS-REFERENCE TO RELATED APPLICATIONS

The present application is a continuation application of International Application No. PCT/JP2019/022019, filed Jun. 3, 2019, which claims priority to Japanese Patent Application No. 2018-110970 filed Jun. 11, 2018. The contents of these applications are incorporated herein by reference in their entirety.

BACKGROUND OF THE INVENTION

Technical Field

The technology disclosed in the present application relates to a rotary connector device and a fixed body of the rotary connector device.

Background Art

There is known a rotary connector device including a fixed body, a rotation body rotatably assembled to the fixed body with respect to the fixed body, and a fixing pin that disables relative rotation between the fixed body and the rotation body (e.g., see Japanese Unexamined Patent Application Publication No. 2016-149291). The fixing pin disclosed in Japanese Unexamined Patent Application Publication No. 2016-149291 is inserted into an insertion opening provided in the fixed body.

SUMMARY

According to one aspect of the present application, a rotary connector device includes a fixed body and a rotation body. The fixed body includes an internal space. The rotation body is rotatably assembled to the fixed body about a rotational axis with respect to the fixed body. The fixed body includes an inserted portion into which a fixing tool is to be inserted to restrict the fixed body and the rotation body from rotating relative to each other. The inserted portion includes an inner space isolated from the internal space of the fixed body.

According to another aspect of the present application, a fixed body of a rotary connector device includes a fixed body main body and an extending portion. The fixed body main body is to be assembled to a rotation body rotatable about a rotational axis. The extending portion includes an internal space and connected to the fixed body main body. The extending portion includes an inserted portion into which a fixing tool is to be inserted to restrict the fixed body main body and the rotation body from rotating relative to each other. The inserted portion includes an inner space isolated from the internal space of the extending portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Hereinafter, embodiments will be described with reference to the drawings. In the figures, the same reference signs denote corresponding or identical components.

Outline of Rotary Connector Device

Figure 1:
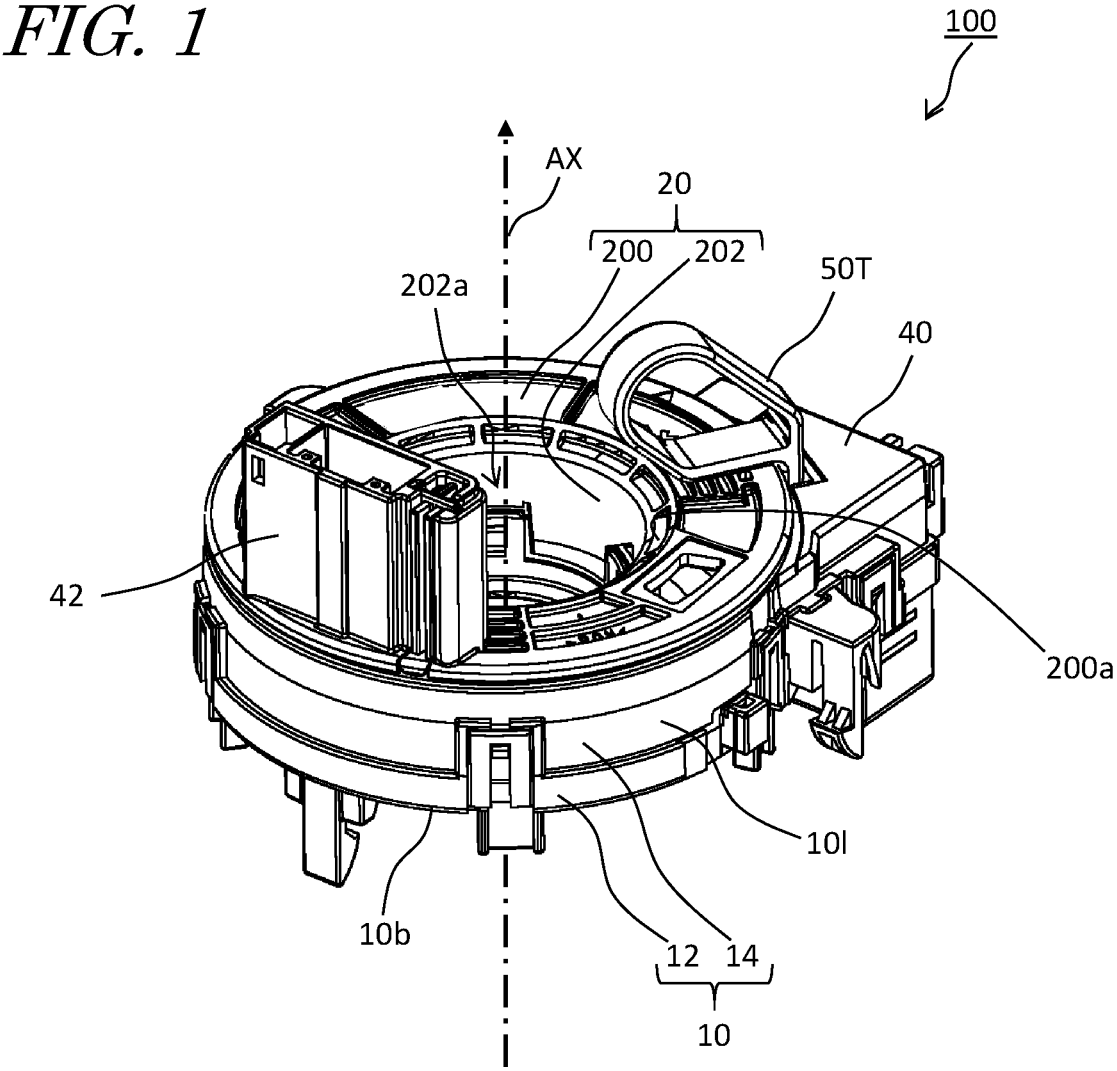
FIG. 1 is a perspective view of a rotary connector device according to an embodiment.
Figure 2:
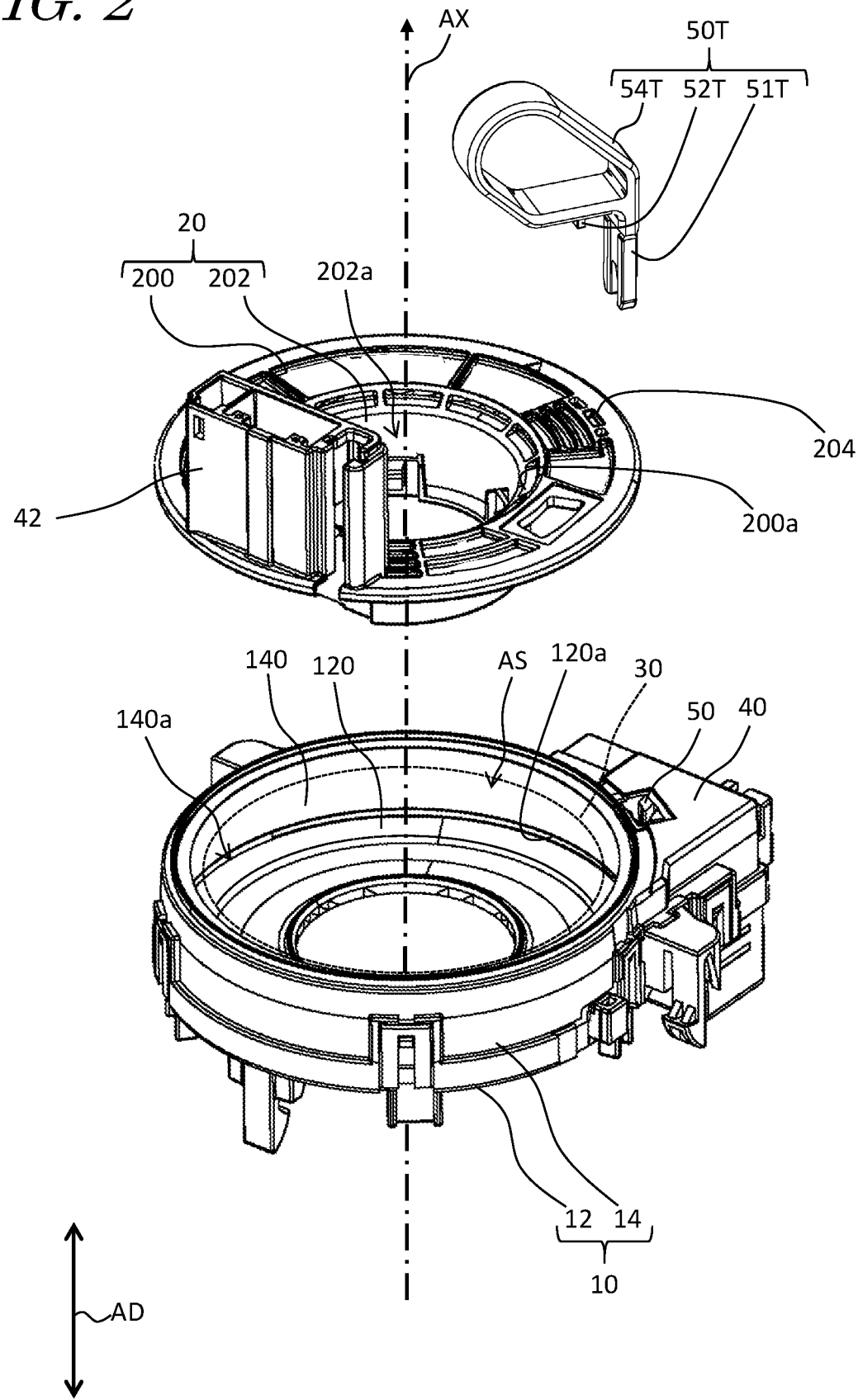
FIG. 2 is an exploded perspective view in which a fixed body and a fixing tool are removed from a rotation body.

FIG. 1 is a perspective view of a rotary connector device 100 according to an embodiment. FIG. 2 is an exploded perspective view in which a fixed body 10 and a fixing tool 50T are removed from a rotation body 20.

As illustrated in FIGS. 1 and 2, the rotary connector device 100 includes the fixed body 10 and the rotation body 20. The rotation body 20 is assembled to the fixed body 10 in a rotatable manner about a rotational axis AX with respect to the fixed body 10. In a state where the rotation body 20 is assembled to the fixed body 10, a housing space AS is defined between the fixed body 10 and the rotation body 20.

As illustrated in FIG. 2, a conductive cable 30 is disposed in the housing space AS. The conductive cable 30 has one end connected to the fixed body 10 and the other end connected to the rotation body 20. With the conductive cable 30 connected to the fixed body 10 and the rotation body 20, the rotation body 20 is rotatable about the rotational axis AX with respect to the fixed body 10. However, the number of cables included in the rotary connector device 100 is not limited to one. For example, the number of cables is an even number, and may be 4, for example. Additionally, for example, the number of cables is an odd number, and may be 3, for example.

The rotary connector device 100 is used, for example, in a moving body (e.g., an automobile) including a main body and a steering portion that is rotatable with respect to the main body. Specifically, the fixed body 10 is attached to the main body of the moving body. The rotation body 20 is attached to the steering portion. That is, the rotation body 20 is provided above the fixed body 10 in a substantially vertical direction. One end of each conductive cable 30 is electrically connected to a corresponding electric device provided in the main body of the moving body. The other end of each conductive cable 30 is electrically connected to a corresponding electrical device (e.g., a switch) provided in the steering portion. Thus, the rotary connector device 100 transmits and receives electric power or electrical signals between the electrical devices provided in the main body of the moving body and the electrical devices provided in the steering portion. However, the rotary connector device 100 may be used for something other than a moving body.

Configuration of Fixed Body

As illustrated in FIGS. 1 and 2, the fixed body 10 includes a first fixed body portion 12 and a second fixed body portion 14. The second fixed body portion 14 is coupled to the first fixed body portion 12 in a state of being disposed on the first fixed body portion 12. The first fixed body portion 12 constitutes a bottom portion 10b of the fixed body 10. The second fixed body portion 14 constitutes a side wall 101 of the fixed body 10. The first fixed body portion 12 and the second fixed body portion 14 constitute a main body of the fixed body.

Figure 3A:
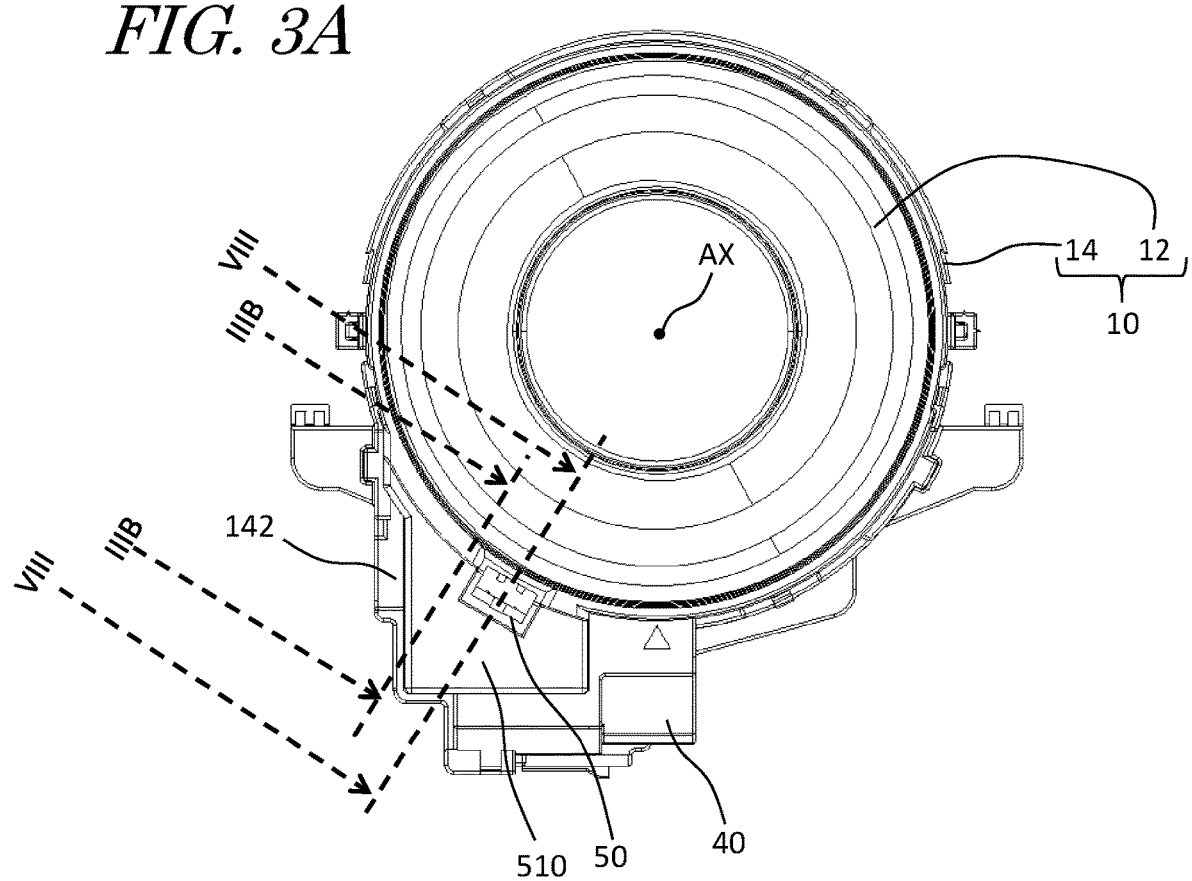
FIG. 3A is a top view of a fixed body.
Figure 3B:
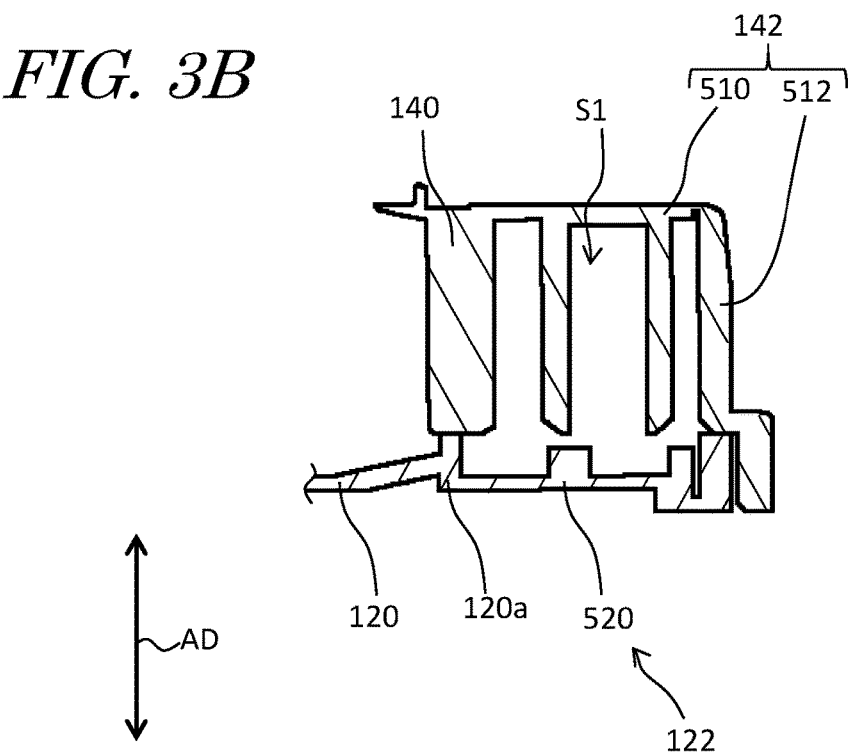
FIG. 3B is a cross-sectional view of the fixed body taken along line IIIB-IIIB of FIG. 3A.

As illustrated in FIGS. 1 and 2, the first fixed body portion 12 includes a first ring portion 120 and a first extending portion 122 (FIG. 3B). The first ring portion 120 has a ring shape when the rotary connector device 100 is viewed in an axial direction AD substantially parallel to the rotational axis AX. The first ring portion 120 is disposed such that the rotational axis AX passes through the center of the first ring portion 120. As illustrated in FIG. 3B, the first extending portion 122 extends outward from an outer periphery 120a of the first ring portion 120 in the radial direction of the rotational axis AX.

As illustrated in FIG. 2, the second fixed body portion 14 includes an outer-circumferential cylindrical portion 140 and a second extending portion 142 (FIG. 3B). The outer-circumferential cylindrical portion 140 is disposed such that a hollow portion 140a of the outer-circumferential cylindrical portion 140 extends in the axial direction AD. The outer-circumferential cylindrical portion 140 extends upward along the axial direction AD from the outer periphery 120a of the first ring portion 120. As illustrated in FIG. 3B, the second extending portion 142 extends outward from the outer-circumferential cylindrical portion 140 in the radial direction of the rotational axis AX. The second extending portion 142 is disposed at a distance from the first extending portion 122 in the axial direction AD. The first extending portion 122 and the second extending portion 142 constitute an extending portion.

FIG. 3A is a top view of the fixed body 10. FIG. 3B is a cross-sectional view of the fixed body 10 taken along line IIIB-IIIB of FIG. 3A. As illustrated in FIG. 3B, the first extending portion 122 and the second extending portion 142 are coupled in the axial direction AD so as to include a space S1 therebetween. More specifically, the second extending portion 142 includes a first wall 510 extending from the outer-circumferential cylindrical portion 140 in a direction substantially orthogonal to the rotational axis AX. The first extending portion 122 includes a second wall 520 extending from the outer periphery 120a of the first ring portion 120 in a direction orthogonal to the rotational axis AX. The first wall 510 and the second wall 520 are disposed at a distance from each other in the axial direction AD. The second extending portion 142 includes a side wall 512 extending in the axial direction AD and connecting the first wall 510 and the second wall 520. Thus, the space S1 inside the fixed body 10 is defined by the first wall 510, the side wall 512, the second wall 520, and the outer-circumferential cylindrical portion 140. A conductor 404 (see FIG. 8) to be described later is disposed in the space S1. The space inside the fixed body 10 includes the space S1 and the housing space AS. However, the side wall 512 may be provided in the first extending portion 122.

Configuration of Rotation Body

As illustrated in FIG. 2, the rotation body 20 includes a second ring portion 200 and an inner-circumferential cylindrical portion 202. The second ring portion 200 has a ring shape when the rotary connector device 100 is viewed in the axial direction AD. The second ring portion 200 is disposed such that the rotational axis AX passes through the center of the second ring portion 200. The inner-circumferential cylindrical portion 202 is disposed such that a hollow portion 202a of the inner-circumferential cylindrical portion 202 extends in the axial direction AD. The inner-circumferential cylindrical portion 202 extends downward along the axial direction AD from an inner periphery 200a of the second ring portion 200. The inner-circumferential cylindrical portion 202 is disposed inward of the outer-circumferential cylindrical portion 140 in the radial direction of the rotational axis AX. Thus, the housing space AS is defined by the first ring portion 120, the outer-circumferential cylindrical portion 140, the second ring portion 200, and the inner-circumferential cylindrical portion 202. In other words, the housing space AS is equal to a space obtained by excluding the hollow portion 202a of the inner-circumferential cylindrical portion 202 from the hollow portion 140a of the outer-circumferential cylindrical portion 140.

In the present embodiment, the inner-circumferential cylindrical portion 202 is provided in the rotation body 20. However, in order to define the housing space AS, the inner-circumferential cylindrical portion 202 may be provided in the fixed body 10.

Further, in the present embodiment, the rotary connector device 100 has a shape including the hollow portion 202a, but the rotary connector device 100 may not include the hollow portion 202a.

Configuration of Connector

As illustrated in FIG. 1, the rotary connector device 100 includes a first connector 40 and a second connector 42. The first connector 40 is connected to, for example, an external cable extending from the main body of the moving body. The second connector 42 is connected to, for example, an external cable extending from a steering portion of the moving body. The first connector 40 and the second connector 42 are electrically connected via the conductive cable 30. More particularly, one end of the conductive cable 30 is connected to the conductor 404 (see FIG. 8) disposed in the space S1. The conductor 404 is electrically connected to a terminal of the first connector 40. The first connector 40 is connected to the fixed body 10 via the first extending portion 122 and the second extending portion 142. The second connector 42 is disposed on the rotation body 20. However, the position of the second connector 42 is not limited to the position illustrated in FIGS. 1 and 2.

Configuration of Fixing Tool

The fixing tool 50T is provided to restrict the rotation body 20 from rotating around the rotational axis AX with respect to the fixed body 10. The fixing tool 50T includes a first insertion portion 51T, a second insertion portion 52T, and a gripping portion 54T. As illustrated in FIG. 2, the first insertion portion 51T extends from the gripping portion 54T. The second insertion portion 52T extends from the gripping portion 54T in substantially the same direction as the direction in which the first insertion portion 51T extends. In a direction substantially orthogonal to a direction in which the first insertion portion 51T and the second insertion portion 52T extend, the first insertion portion 51T and the second insertion portion 52T are provided at different positions.

The first insertion portion 51T can be inserted into and removed from an inserted portion 50 provided in the fixed body 10 in the axial direction AD. When the first insertion portion 51T is inserted into the inserted portion 50, the second insertion portion 52T is inserted into and removed from a groove 204 provided in the second ring portion 200 of the rotation body 20 in the axial direction AD. As a result, the rotation position of the rotation body 20 around the rotational axis AX with respect to the fixed body 10 is fixed. The second insertion portion 52T is removed from the groove 204 when the first insertion portion 51T is removed from the inserted portion 50. However, the structure in which the second insertion portion 52T is locked to the rotation body 20 is not limited to the example illustrated in FIG. 2.

Figure 4:
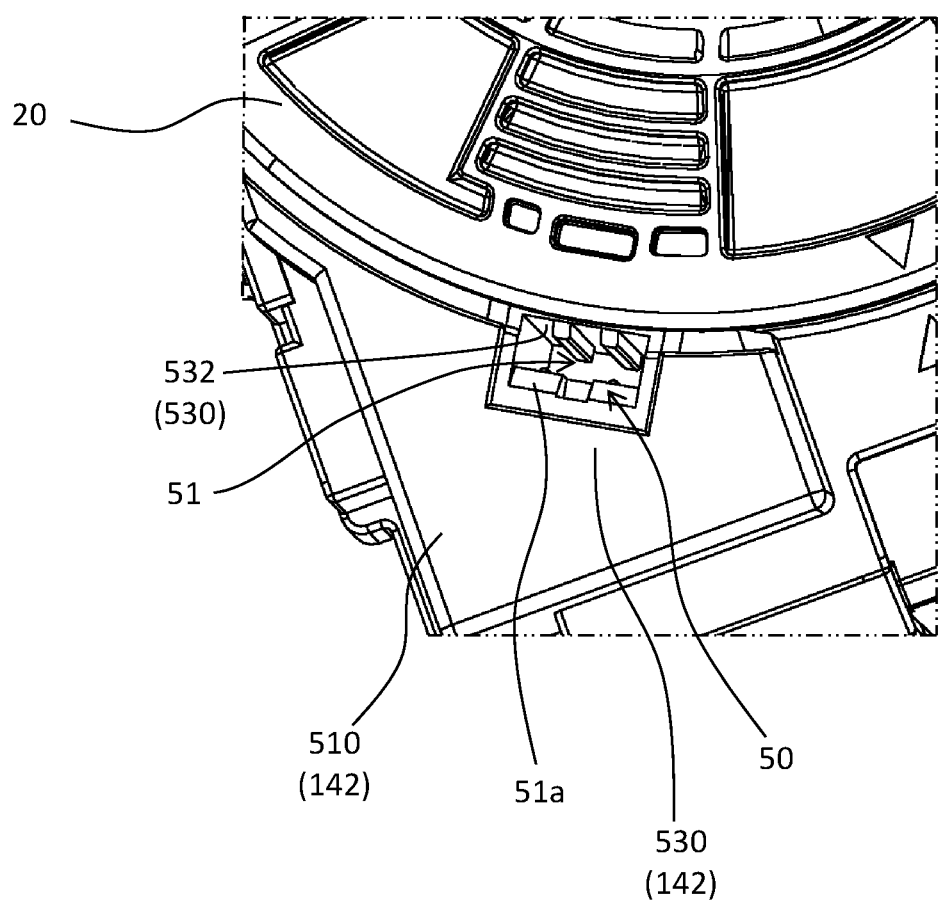
FIG. 4 is an enlarged view of a perspective view of the rotary connector device for illustrating a first opening of an inserted portion.
Figure 5:
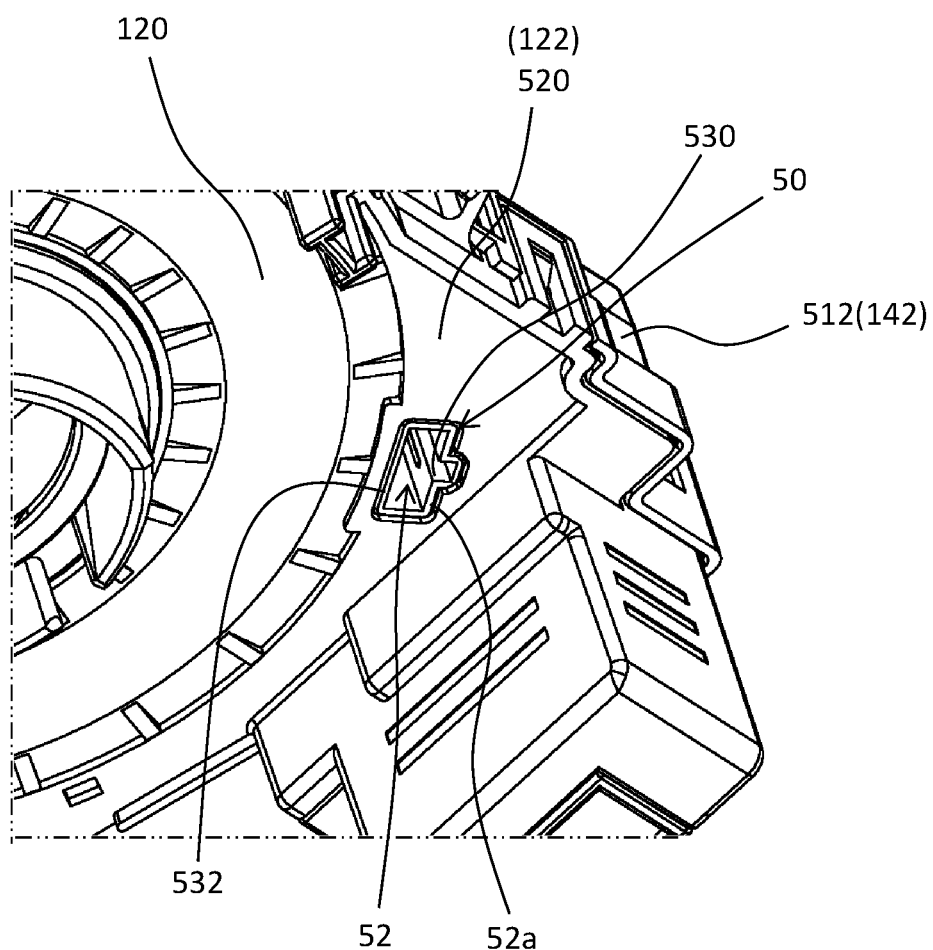
FIG. 5 is an enlarged view of a perspective view of the rotary connector device for illustrating a second opening of the inserted portion.
Figure 6:
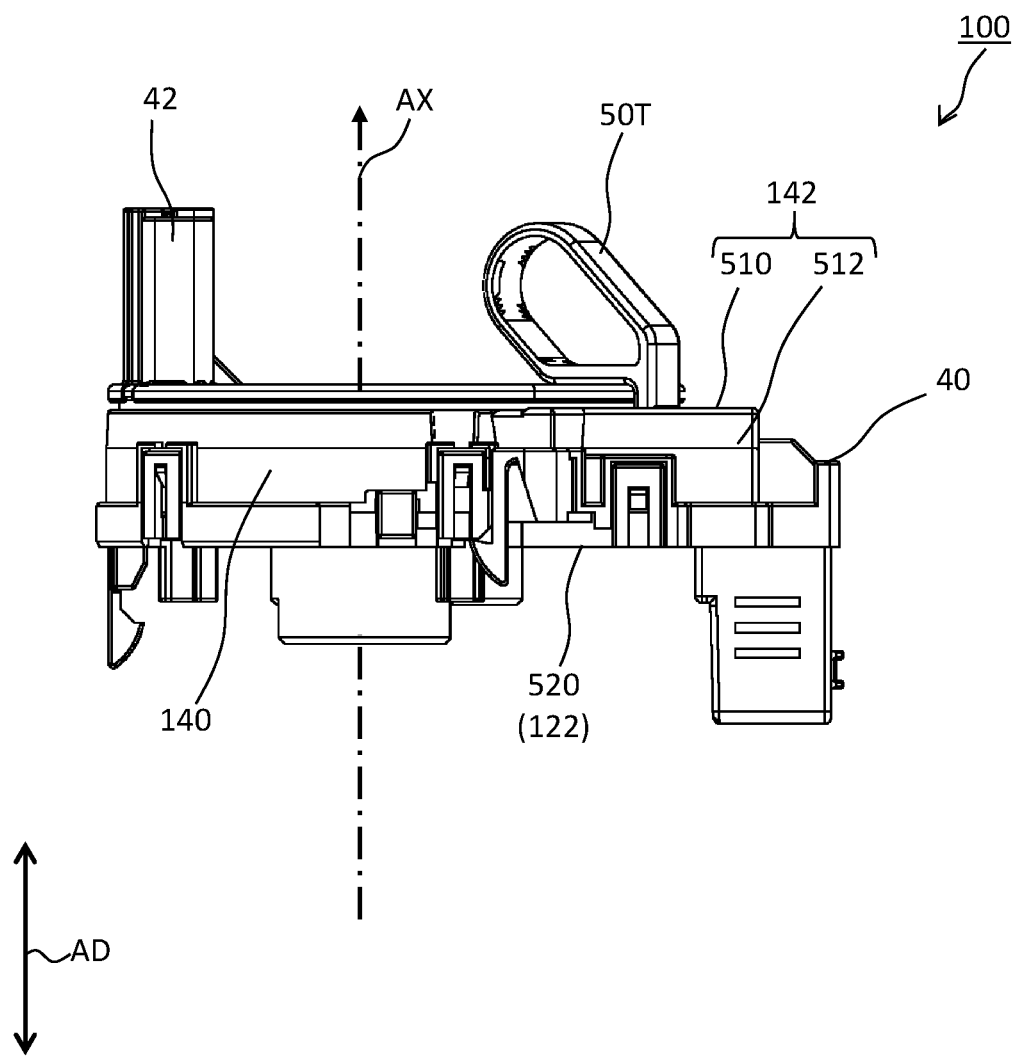
FIG. 6 is a side view of the rotary connector device.

More specifically, as illustrated in FIGS. 4 and 5, the inserted portion 50 passes through the first extending portion 122 of the first fixed body portion 12 and the second extending portion 142 of the second fixed body portion 14 in a direction substantially parallel to the axial direction AD. The first opening 51 of the inserted portion 50 is provided in the first wall 510. The second opening 52 of the inserted portion 50 is provided in the second wall 520. The area of the second opening 52 is substantially the same as the area of the first opening 51. The first insertion portion 51T of the fixing tool 50T is inserted into the inserted portion 50 through the first opening 51 in the axial direction AD.

As illustrated in FIG. 4, the second extending portion 142 includes a third wall 530 extending from an outer edge 51a of a first opening 51 toward a second opening 52 in the axial direction AD. That is, the third wall 530 is connected to the first wall 510. In the present embodiment, the third wall 530 and the first wall 510 are formed of a single member. However, the third wall 530 and the first wall 510 may be formed of separate members.

The third wall 530 has a cylindrical shape extending in the axial direction AD so as to define the inner space S2 of the inserted portion 50. As illustrated in FIG. 5, the third wall 530 reaches an outer edge 52a of the second opening 52. The third wall 530 includes a radially inner portion 532 that is disposed at a distance from the rotational axis AX in a direction substantially perpendicular to the rotational axis AX. The radially inner portion 532 is formed by a portion of the outer-circumferential cylindrical portion 140. In this way, when the third wall 530 for defining the inner space S2 of the inserted portion 50 is shared with a portion of the outer-circumferential cylindrical portion 140, the structure of the fixed body 10 can be simplified. However, the radially inner portion 532 and the outer-circumferential cylindrical portion 140 may be configured separately.

Figure 7:
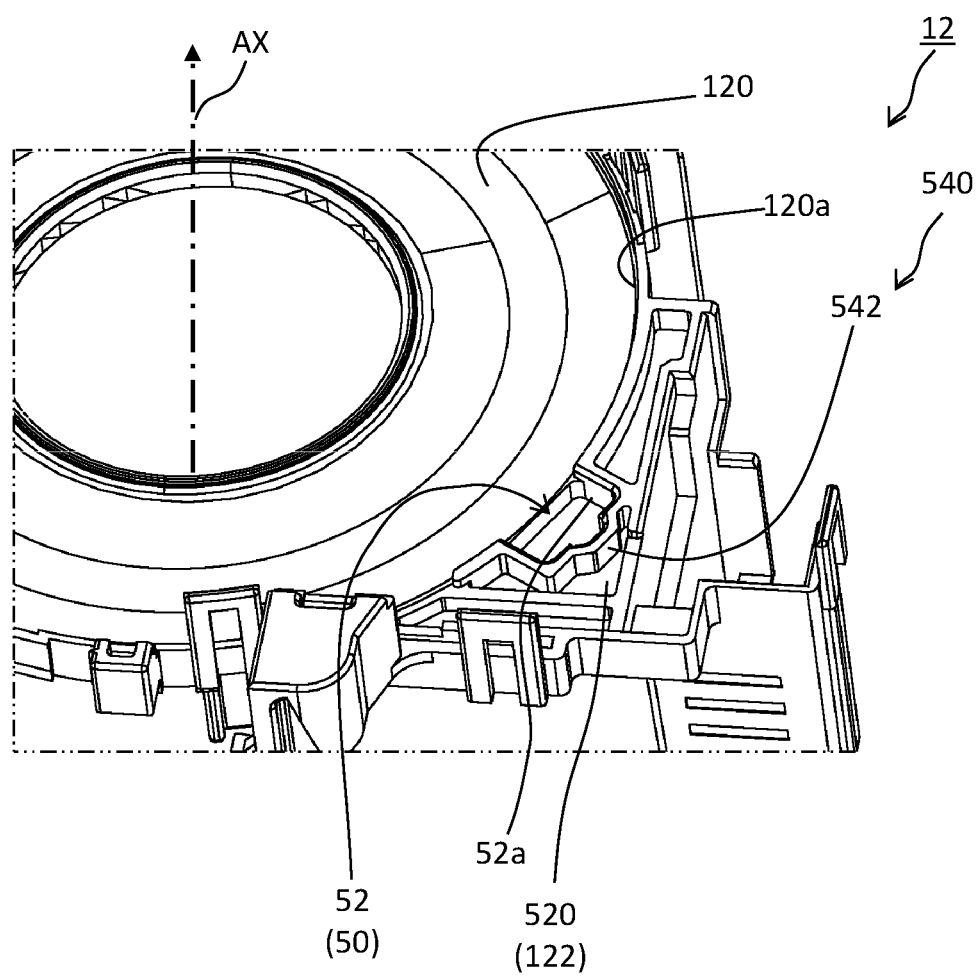
FIG. 7 is a perspective view of a first fixed body portion.

As illustrated in FIG. 7, the first extending portion 122 includes a fourth wall 540 extending from the outer edge 52a of the second opening 52 toward the first opening 51 in the axial direction AD. That is, the fourth wall 540 is connected to the second wall 520. In the present embodiment, the fourth wall 540 and the second wall 520 are formed of a single member, but may be formed of separate members.

Figure 8:
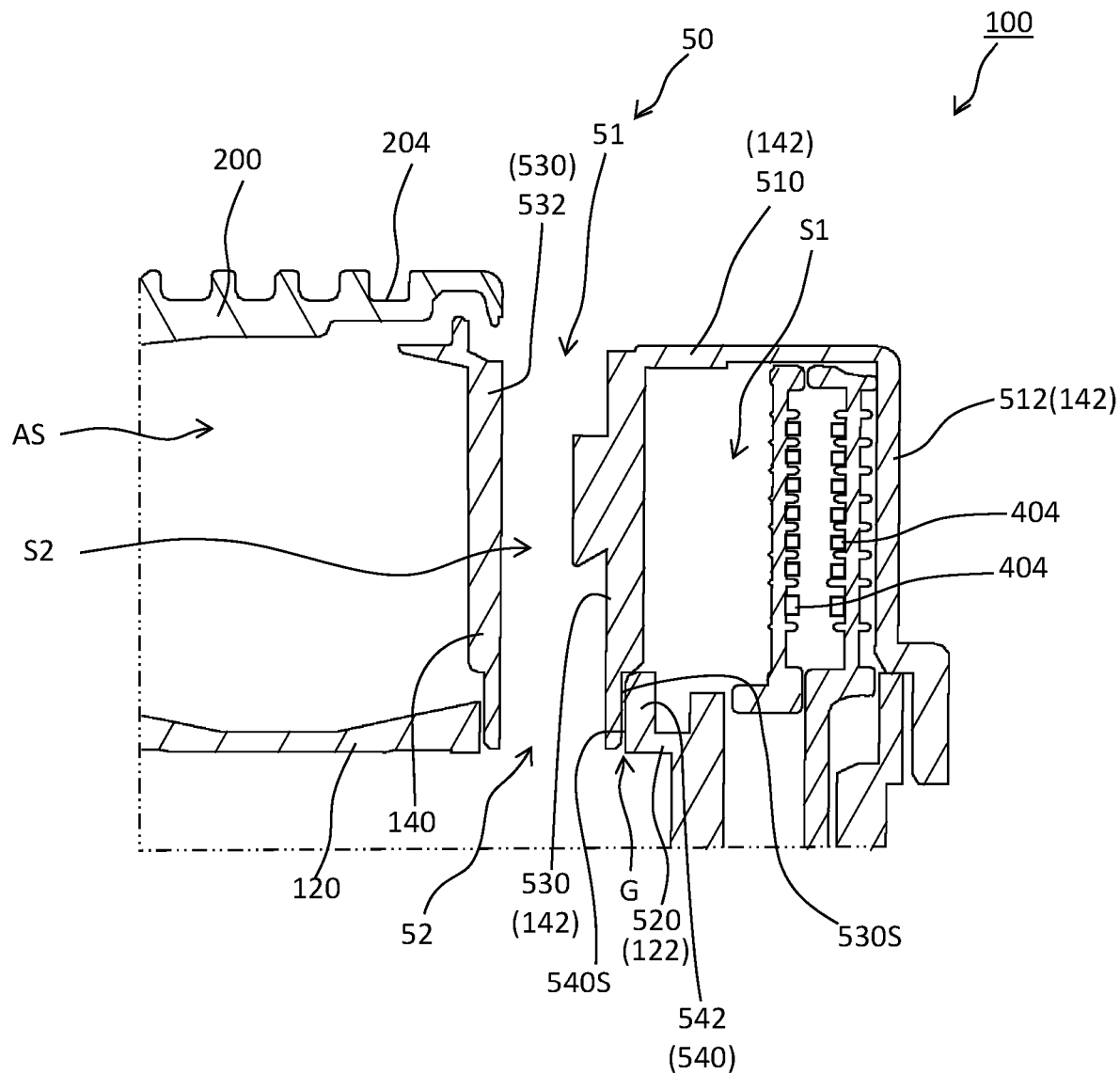
FIG. 8 is a cross-sectional view of the rotary connector device taken along line VIII-VIII of FIG. 3A.

As illustrated in the cross-sectional view of FIG. 8, the third wall 530 and the fourth wall 540 are fitted such that an inner surface 540S of the fourth wall 540 abuts on an outer surface 530S of the third wall 530 in a direction substantially orthogonal to the rotational axis Ax. That is, in the direction substantially orthogonal to the rotational axis AX, the third wall 530 is covered by the fourth wall 540 in a direct contact manner. Accordingly, a clearance path from a clearance G between the third wall 530 and the fourth wall 540 to the space S1 of the fixed body 10 is provided upward in the axial direction AD. Therefore, foreign matter that has entered downward from the first opening 51 in the axial direction AD is less likely to pass through the upward clearance path. However, the third wall 530 and the fourth wall 540 may be fitted together such that the inner surface of the third wall 530 abuts on the outer surface of the fourth wall 540.

The clearance G between the third wall 530 and the fourth wall 540 is closer to the second opening 52 than to the first opening 51 in the axial direction AD. However, the clearance G between the third wall 530 and the fourth wall 540 may be closer to the first opening 51 than to the second opening 52 in the axial direction AD. The fourth wall 540 may be omitted. For example, when the fourth wall 540 is omitted, the third wall 530 extends in the axial direction AD until it connects to the second wall 520.

With the structure described above, as illustrated in FIG. 8, the inner space S2 and the space S1 inside the fixed body 10 are isolated from each other. Therefore, the inner space S2 and the conductor 404 disposed in the space S1 are isolated from each other. Furthermore, the inner space S2 and the housing space AS are isolated from each other.

In the present embodiment, the fourth wall 540 has a cylindrical shape in which the inner portion of the fourth wall 540 in the radial direction of the rotational axis AX is missing when viewed in the axial direction AD. The fourth wall 540 includes at least a wall portion 542 disposed at a distance from the conductor 404 disposed in the space S1. Therefore, the clearance path between the wall portion 542 and the third wall 530 is long in the axial direction AD. However, the fourth wall 540 may have a cylindrical shape in which a missing portion is not provided.

In the present embodiment, the inserted portion 50 is surrounded by the housing space AS and the space S1 in the direction orthogonal to the axial direction AD. However, the inserted portion 50 may not be surrounded by the housing space AS and the space S1. That is, the inserted portion 50 may not be surrounded by the space of the fixed body 10.

Next, an inserted portion 50A according to a modified example of the inserted portion 50 will be described with reference to FIG. 9. The inserted portion 50A is different from the inserted portion 50 in that the inserted portion 50A does not pass through the first extending portion 122 in the axial direction AD. Descriptions of identical configurations are omitted.

Figure 9:
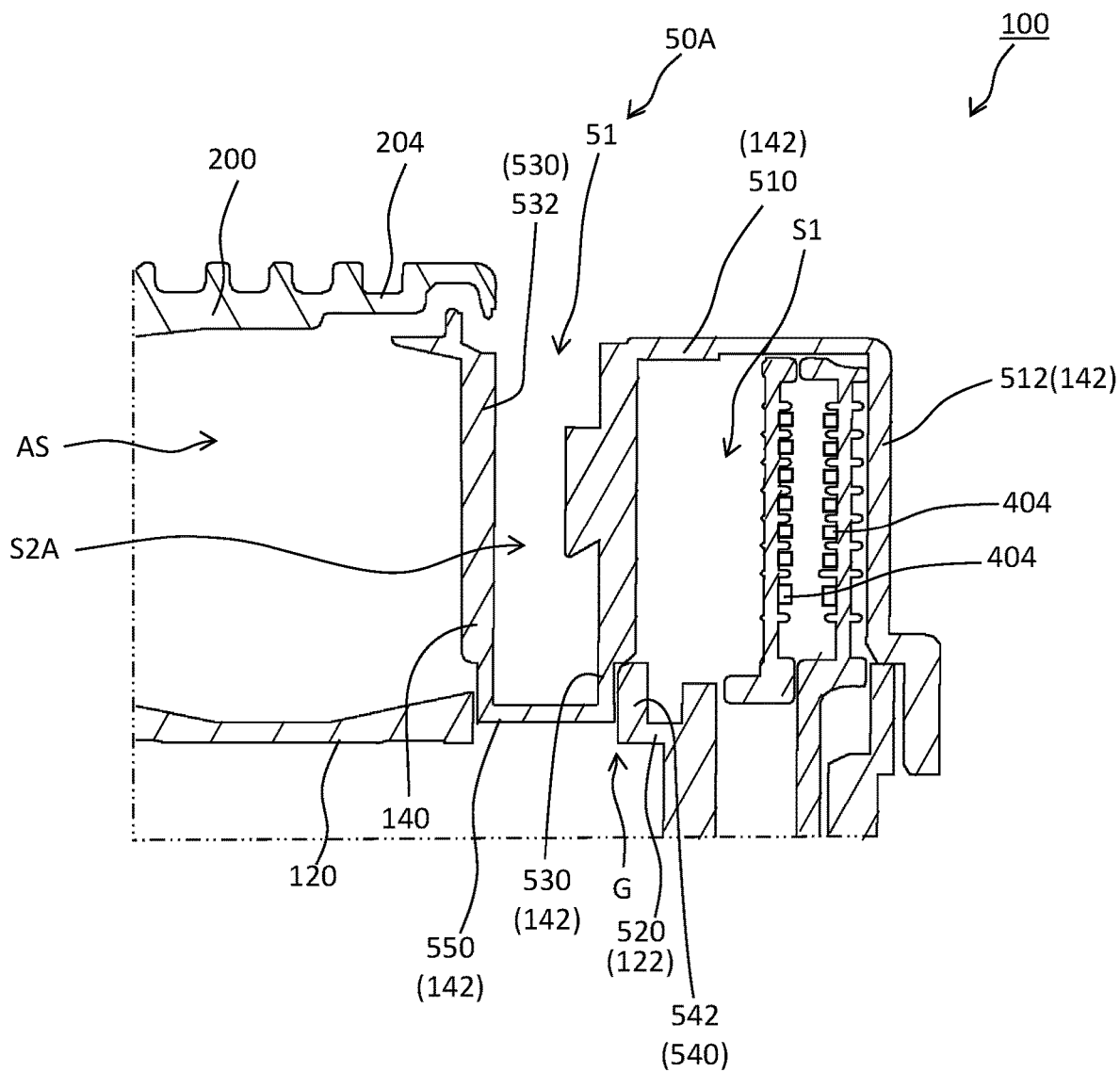
FIG. 9 is a cross-sectional view of a rotary connector device according to a modified example.

As illustrated in FIG. 9, the inserted portion 50A is recessed downward from the first wall 510 in the axial direction AD. Specifically, a fifth wall 550 extends in a direction substantially orthogonal to the rotational axis AX so as to close a lower opening of the third wall 530 in the axial direction AD. An inner space S2A of the inserted portion 50A is defined by the third wall 530 and the fifth wall 550. Also in the present modified example, the inner space S2A of the inserted portion 50A is isolated from the space S1 inside the fixed body 10. The fifth wall 550 may be a portion of the second wall 520. That is, a portion of the second wall 520 in which the second opening 52 is not provided may be the bottom wall of the inserted portion 50A.

Features of Embodiments and Modified Examples

The rotary connector device 100 includes the fixed body 10 including the space 51 and the housing space AS therein, and the rotation body 20 rotatably assembled to the fixed body 10 about the rotational axis AX with respect to the fixed body 10. The fixed body 10 includes the inserted portion 50 into which the fixing tool 50T is to be inserted to restrict the fixed body 10 and the rotation body 20 from rotating relative to each other. The inner space S2 of the inserted portion 50 is isolated from the space S1 and the housing space AS.

With the rotary connector device 100, because the inner space S2 of the inserted portion 50 is isolated from the space S1 and the housing space AS of the fixed body 10, foreign matter is restricted from entering the space S1 and the housing space AS through the inserted portion 50. This improves environmental resistance of the rotary connector device 100. The foreign matter is a fluid such as water or a powder such as dust. However, the inner space S2 may not be isolated from the housing space AS.

The inserted portion 50 penetrates the fixed body 10 in the axial direction AD substantially parallel to the rotational axis AX.

Therefore, even when foreign matter enters the inner space S2 of the inserted portion 50 along the axial direction AD, the foreign matter that has entered escapes to the outside of the inserted portion 50 along the axial direction AD, and thus the foreign matter is less likely to accumulate in the inner space S2 of the inserted portion 50.

The fixed body 10 includes the first wall 510 substantially orthogonal to the rotational axis AX, and the second wall 520 disposed at a distance from the first wall 510 in the axial direction AD substantially parallel to the rotational axis AX. The space S1 is provided between the first wall 510 and the second wall 520, the inserted portion 50 includes the first opening 51 provided in the first wall 510, and the first wall 510 is closer to the rotation body 20 than the second wall 520 in the axial direction AD. Specifically, as illustrated in FIG. 8, the first wall 510 is closer to the second ring portion 200 of the rotation body 20 than the second wall 520 in the axial direction AD.

Even when foreign matter is likely to come into contact with the first wall 510 close to the rotation body 20 and the first opening 51 is provided in the first wall 510, the inner space S2 of the inserted portion 50 and the space S1 of the fixed body 10 are isolated from each other. Thus, foreign matter is suppressed from entering the space S1 of the fixed body 10 through the first opening 51.

Further, the inserted portion 50 includes the second opening 52 provided in the second wall 520, and the area of the first opening 51 is substantially the same as the area of the second opening 52.

Therefore, foreign matter that has entered the inner space S2 of the inserted portion 50 is more likely to escape to the outside of the inserted portion 50 through the second opening 52, as compared with a case where the area of the second opening 52 is smaller than the area of the first opening 51.

The fixed body 10 includes the third wall 530 extending from the outer edge 51a of the first opening 51 in the axial direction AD, and the fourth wall 540 extending from the outer edge 52a of the second opening 52 in the axial direction AD. The third wall 530 and the fourth wall 540 are in contact with each other in a direction substantially orthogonal to the rotational axis AX.

Therefore, a clearance path from the clearance G between the third wall 530 and the fourth wall 540 to the space S1 of the fixed body 10 is longer than that in a structure in which the third wall 530 and the fourth wall 540 are only coupled in the axial direction AD. Therefore, foreign matter is suppressed from entering the space S1 of the fixed body 10 through the clearance G between the third wall 530 and the fourth wall 540.

The rotary connector device 100 further includes the conductor 404 disposed in the fixed body 10 in the space S1. The fourth wall 540 includes the wall portion 542 disposed at a distance from the conductor 404, and the third wall 530 is covered by the wall portion 542 in a direction substantially orthogonal to the rotational axis AX.

Therefore, even when foreign matter enters through the clearance G between the third wall 530 and the fourth wall 540, the clearance path from the clearance G to the conductor 404 is lengthened by the wall portion 542, Therefore, foreign matter is less likely to reach the conductor 404.

The clearance G is closer to the second opening 52 than to the first opening 51 in the axial direction AD.

Therefore, foreign matter that has entered through the first opening 51 is less likely to reach the clearance G, and thus is less likely to enter the space S1 and the housing space AS of the fixed body 10 through the clearance G.

The fixed body 10 includes the first wall 510 substantially perpendicular to the rotational axis AX, and the second wall 520 disposed at a distance from the first wall 510 in the axial direction AD substantially parallel to the rotational axis AX, the inserted portion 50 includes the first opening 51 provided in the first wall 510, the fixed body 10 includes the third wall 530 extending from the outer edge 51a of the first opening 51 in the axial direction AD and connected to the second wall 520, and the third wall 530 and the first wall 510 are composed of a single member.

Because the first wall 510 and the third wall 530 are formed of a single member, there is no clearance between the first wall 510 and the third wall 530. Therefore, it is difficult for foreign matter to enter the space S1 and the housing space AS of the fixed body 10 through the inserted portion 50.

The inserted portion 50 and the inserted portion 50A are surrounded by the space S1 and the housing space AS.

In this way, even when the inserted portion 50 and the inserted portion 50A are surrounded by the space of the fixed body 10, because the inner space S2 and the inner space S2A are separated from the space of the fixed body 10, it is difficult for foreign matter to enter the space of the fixed body 10 through the inserted portion 50 and the inserted portion 50A.

Further, the fixed body 10 includes a fixed body main body (the first fixed body portion 12 and the second fixed body portion 14) that is assembled to the rotation body 20 rotatable about the rotational axis AX, and an extending portion (the first extending portion 122 and the second extending portion 142) including the internal space S1 and connected to the fixed body main body. The extending portion includes the inserted portion 50 into which the fixing tool 50T is to be inserted to restrict the fixed body main body and the rotation body 20 from rotating relative to each other, and the inner space S2 of the inserted portion 50 is isolated from the space S1 of the extending portion and the housing space AS.

With this configuration, entry of foreign matter into the space S1 and the housing space AS through the inner space S2 of the inserted portion 50 is suppressed. This improves the environmental resistance of the rotary connector device 100. However, the inner space S2 may not be isolated from the housing space AS.

Other Examples

The direction in which the inserted portion 50 penetrates the fixed body 10 (the direction in which the inserted portion 50 is recessed) is not limited to the above-described example. For example, the inserted portion 50 may be recessed from the side wall 512 in a direction substantially orthogonal to the rotational axis AX. In addition, the inserted portion 50 may have a shape that penetrates the outer-circumferential cylindrical portion 140 or is recessed from the outer-circumferential cylindrical portion 140 in a direction substantially orthogonal to the rotational axis AX.

In addition, the third wall 530 may be provided in the first extending portion 122, and the fourth wall 540 may be provided in the second extending portion 142.

It should be noted that in the present application, "comprise" and its derivatives are open-ended terms that describe the presence of elements and do not exclude the presence of other elements not described. This also applies to "have," "include" and derivatives thereof.

In the present application, a number such as "first" or "second" is merely a term for identifying a configuration, and does not have any other meaning (e.g., a particular order, or the like). The presence of, for example, a "first element" does not imply that a "second element" exists, and the presence of a "second element" does not imply that a "first element" exists.

Expressions such as "parallel," "orthogonal," and "identical" in the present disclosure should not be interpreted strictly and include the meanings of "substantially parallel," "substantially orthogonal," and "substantially identical." Further, representations of other arrangements are not to be strictly interpreted.

Various alterations and modifications of the disclosure are apparent from the foregoing disclosure. Accordingly, the disclosure may be implemented in a manner different from the specific disclosure of the present application without departing from the spirit of the disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary connector device comprising:
a fixed body comprising an internal space;
a rotation body rotatably assembled to the fixed body about a rotational axis with respect to the fixed body;
the fixed body comprising an inserted portion into which a fixing tool is to be inserted to restrict the fixed body and the rotation body from rotating relative to each other; and
the inserted portion comprising an inner space isolated from the internal space of the fixed body,
the fixed body comprising a first wall substantially perpendicular to the rotational axis, and a second wall disposed at a distance from the first wall in an axial direction substantially parallel to the rotational axis,
the internal space of the fixed body being provided between the first wall and the second wall,
the inserted portion comprising a first opening provided in the first wall,
the inserted portion comprising a second opening provided in the second wall,
an area of the first opening being substantially identical to an area of the second opening,
the fixed body comprising a first fixed body portion and a second fixed body portion coupled to the first fixed body portion,
the first fixed body portion comprising a third wall extending from an outer edge of the first opening in the axial direction, and
the second fixed body portion comprising a fourth wall extending from an outer edge of the second opening in the axial direction, the third wall and the fourth wall being in contact with each other in a direction substantially orthogonal to the rotational axis.

2. The rotary connector device according to claim 1, wherein the inserted portion penetrates the fixed body in an axial direction substantially parallel to the rotational axis.

3. The rotary connector device according to claim 1, further comprising:
a conductor disposed in the fixed body in the internal space,
wherein the fourth wall comprises a wall portion disposed at a distance from the conductor, and
the third wall is covered by the wall portion in a direction substantially orthogonal to the rotational axis.

4. The rotary connector device according to claim 3, wherein a clearance between the third wall and the fourth wall is closer to the second opening than to the first opening in the axial direction.

5. The rotary connector device according to claim 1, wherein a clearance between the third wall and the fourth wall is closer to the second opening than to the first opening in the axial direction.

6. A rotary connector device comprising:
a fixed body comprising an internal space;
a rotation body rotatably assembled to the fixed body about a rotational axis with respect to the fixed body;
the fixed body comprising an inserted portion into which a fixing tool is to be inserted to restrict the fixed body and the rotation body from rotating relative to each other; and
the inserted portion comprising an inner space isolated from the internal space of the fixed body, wherein
the fixed body comprises a first wall substantially perpendicular to the rotational axis, and a second wall disposed at a distance from the first wall in an axial direction substantially parallel to the rotational axis,
the inserted portion comprises a first opening provided in the first wall,
the fixed body comprises a third wall extending from an outer edge of the first opening in the axial direction and connected to the second wall, and
the third wall and the first wall are formed of a single member.

7. The rotary connector device according to claim 1, further comprising the fixing tool.

8. The rotary connector device according to claim 1, wherein the inserted portion is surrounded by the internal space.

9. A fixed body of a rotary connector device, comprising:
a fixed body main body to be assembled to a rotation body rotatable about a rotational axis;
an extending portion comprising an internal space and connected to the fixed body main body;
a first wall substantially perpendicular to the rotational axis; and
a second wall disposed at a distance from the first wall in an axial direction substantially parallel to the rotational axis,
the extending portion comprising an inserted portion into which a fixing tool is to be inserted to restrict the fixed body main body and the rotation body from rotating relative to each other,
the inserted portion comprising an inner space isolated from the internal space of the extending portion, the internal space of the fixed body being provided between the first wall and the second wall, the inserted portion comprising a first opening provided in the first wall, the inserted portion comprising a second opening provided in the second wall, an area of the first opening being substantially identical to an area of the second opening, the fixed body main body comprising a first fixed body portion and a second fixed body portion coupled to the first fixed body portion, the first fixed body portion comprising a third wall extending from an outer edge of the first opening in the axial direction, and the second fixed body portion comprising a fourth wall extending from an outer edge of the second opening in the axial direction, the third wall and the fourth wall being in contact with each other in a direction substantially orthogonal to the rotational axis.

* * * * *